(12) United States Patent
Opgenoorth

(10) Patent No.: US 6,308,223 B1
(45) Date of Patent: Oct. 23, 2001

(54) PROCESS FOR THE SYNCHRONIZATION OF PROGRAMS ON DIFFERENT COMPUTERS OF AN INTERCONNECTED SYSTEM

(75) Inventor: Bernd Opgenoorth, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/197,509

(22) Filed: Nov. 23, 1998

Related U.S. Application Data

(63) Continuation of application No. PCT/DE97/01023, filed on May 21, 1997.

(30) Foreign Application Priority Data

May 22, 1996 (DE) .............................................. 196 20 622

(51) Int. Cl.$^7$ .................................................. G06F 13/00
(52) U.S. Cl. .......................................................... 709/248
(58) Field of Search .................................... 709/248, 206, 709/400, 237, 201, 209, 212, 216, 227, 238

(56) References Cited

U.S. PATENT DOCUMENTS

| 4,099,241 | * | 7/1978 | Ossfeldt | 709/400 |
| 4,584,643 | * | 4/1986 | Halpern et al. | 709/248 |
| 5,041,966 | * | 8/1991 | Nakai et al. | 709/400 |
| 5,287,492 | * | 2/1994 | Reynders | 714/12 |
| 5,382,950 | * | 1/1995 | Gronemeyer | 714/797 |
| 5,428,645 | * | 6/1995 | Dolev et al. | 375/354 |
| 5,440,750 |   | 8/1995 | Kitai et al. | 395/800 |
| 5,448,732 | * | 9/1995 | Matsumoto | 709/104 |
| 5,450,573 | * | 9/1995 | Gronemeyer | 709/400 |
| 5,689,688 | * | 11/1997 | Strong et al. | 709/400 |
| 5,727,154 | * | 3/1998 | Fry et al. | 709/248 |
| 5,761,439 | * | 6/1998 | Kar et al. | 709/248 |
| 5,887,143 | * | 3/1999 | Saito et al. | 709/248 |
| 5,918,040 | * | 6/1999 | Javis | 709/400 |

FOREIGN PATENT DOCUMENTS 4101623 7/1991 (DE) .

* cited by examiner

Primary Examiner—Moustafa M. Meky
(74) Attorney, Agent, or Firm—Sughrue, Mion, Zinn, Macpeak & Seas, PLLC

(57) ABSTRACT

The processing of instructions in a program (task A, . . . ) in one computer (A, . . . ) is interrupted when an instruction (syncpoint x, . . . ) occurs which requests synchronization with a program (task B, . . . ) on another computer (B, . . . ). A set of synchronization data (syncdata x, . . . ) for a program (task B, . . . ) on at least one other computer (B, . . . ) is then fed into a data interface (1, 3, 6) from each program involved, a change is made to a receive state, and the processing of the instructions in a program (task A, . . . ) is interrupted until a set of synchronization data (syncdata y, . . . ) has been received from programs (task B, . . . ) in the other computers (B, . . . )

11 Claims, 3 Drawing Sheets

PROCESS FOR THE SYNCHRONIZATION OF PROGRAMS ON DIFFERENT COMPUTERS OF AN INTERCONNECTED SYSTEM

This is a Continuation of International Application PCT/DE97/01023, with an international filing date of May 21, 1997, the disclosure of which is incorporated into this application by reference.

FIELD OF AND BACKGROUND OF THE INVENTION

The invention relates to new and useful improvements in computer systems. More particularly, the invention relates to a method for synchronization of programs on different computers in a network.

Computer systems are increasingly being networked to one another via communication devices. In some applications, particular attention has to be paid to the synchronization of the data processing systems which are interconnected in a network.

The type of synchronization may be subject to various requirements. On the one hand, the synchronism required of the computers in a network may be predominantly of a time nature. The computers should operate as nearly in parallel as possible, i.e., the processing of the instructions in a program which is running should as far as possible always be at the same processing state at any point in time. Thus, if possible, the computers should all be processing the same processing sequence at all times.

Going beyond pure temporal parallelism, the synchronism of computers in a network may be subject to the additional requirement that the respective processing sequences in the computers should also, if possible, have the same meaning content in terms of data technology. This means that the computers in a network, having approximately concurrent instruction processing based on initial values which are as identical as possible, should also achieve result values which are as identical as possible. In such a case, comparisons of original values as well as selected current processing values from the individual programs on the computers is advantageous in the context of temporal synchronization.

In practical technical applications, owing to the widely different types of disrupting influences, it is impossible for the instruction processing in different computers that are networked to one another in a network to maintain time and/or logical-content synchronism over a lengthy time period. In fact, as a rule, special technical measures have to be carried out cyclically in order to maintain or reproduce the synchronism of the instruction processing actions in the computers.

This is particularly important if the computers in a network are intended to form a so-called high-availability or fail-safe system. Examples of this are so-called "one of two" or "two of two" systems.

In the case of a "one of two" system, two connected computers with identical programs are intended to process the same original data, such as measurements, subject to the boundary condition of high computer system availability. It is necessary to ensure regularly that the processing states of the two computers do not diverge too severely in the medium term as the result of processing speeds which may differ only slightly from one another. Furthermore, it is necessary to ensure regularly that both computers have matching processing results. Specifically, in a situation in which the two computers are used for controlling a technical process which requires high availability, and one of the two computers fails, this is a precondition for the other computer to be able to continue to control the technical process virtually without any discontinuity. Thus, in the case of such a "one of two" system, the two computers involved must be synchronized in time by means of special synchronization measures. Furthermore, their current processing contents must be regularly checked for equivalence.

The conditions in a so-called "two of two" computer system are very similar to those for a "one of two" computer system. Two connected computers with identical programs are intended to process the same original data, such as measurements, subject to the boundary condition of high processing reliability. However, the desired result reliability is no longer provided if a sudden, uncorrectable non-equivalence is detected in the processing results. Thus, in the case of safety-relevant processing, the user programs on both computers must be brought to a safe state, for example the stop state. Further processing of the safety-relevant process is no longer possible since it is impossible to decide which program on which of the two computers had the still "correct" processing results at the moment when the non-equivalence suddenly occurred.

Comparable boundary conditions also exist in a so-called "two of three" system. In this case, the requirements for high system availability and high data processing reliability can be satisfied at the same time. Three connected computers can process the same original data, using identical programs. Once again, it is necessary to ensure at regular time intervals that the processing states of the three computers have not diverged too severely and that each computer is producing the same processing results. If any non-equivalences are detected during a comparison of current processing results, then one computer may be regarded as being defective, and must be excluded from the network if its current processing results suddenly and permanently deviate from the matching processing results of the two other computers. The system maintains both processing reliability and availability if one of the three computers fails. This process is also called majority decision. Following such a situation, the original "three of two" system then, in practice, reverts to a "two of two" system or a "one of two" system depending on whether the two remaining computers in the system are intended to continue processing the data for the respective programs with high result reliability or with high availability.

In the case of computer systems of the above type, regularly repeating measures must generally be used to ensure and/or reproduce the temporal parallelism of the internal processing sequence of the instructions. The measures which are required for such synchronization are intended to have as little adverse effect as possible on the normal operation of each computer involved and to run as quickly as possible.

OBJECTS OF THE INVENTION

It is therefore an object of the invention to provide a method for synchronizing at least two user programs on computers that are connected to one another. Another object is to provide such a method that is simple, robust, and consumes only a relatively small amount of processing time.

SUMMARY OF THE INVENTION

These and other objects are achieved by a method according to the invention for synchronizing programs on at least two computers in a network, where the computers are connected to one another via a data interface. The inventive method involves, first, interrupting processing of instructions in a program that is running on one of the computers when, during the processing, an instruction occurs which requests synchronization of the program in the one computer with at least one other program on at least one other of the computers in the network. Next, at least one set of synchronization data is fed from the one computer into the data interface for the at least one other computer in the network. Then, after feeding in the at least one set of synchronization data, the one computer is switched to a receive state. Finally, the processing of the instructions in the program that is running on the one computer is interrupted until the one computer has received, via the data interface, at least one set of synchronization data from the at least one other program on the at least one other computer in the network. Particularly advantageous refinements of the invention are the subject matter of the dependent claims.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
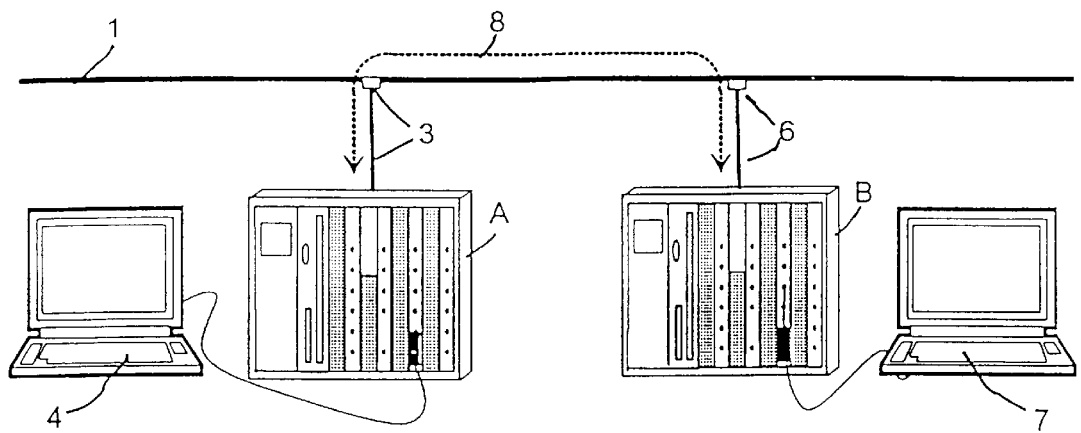
FIG. 1: shows two computers which form a network by means of a communications link which is set up via a databus.

FIG. 1 shows a first example of a communications link between two data processing systems, which are called computers in the following text. A first computer A, which can be operated via a keyboard and a screen 4, is connected to a databus 1 via a first coupling 3, and a second computer B, which can be operated via a keyboard and a screen 6, is connected to the databus 1 via a second coupling 6. A permanent communications link 8 is set up between these two computers, and is indicated in FIG. 1 by a dashed line 8. Such a permanent, connection-oriented communications link can be used to interchange data continuously and directly between the two computers. Each computer is set up to send data just to the other computer and to receive data from it.

Figure 2:
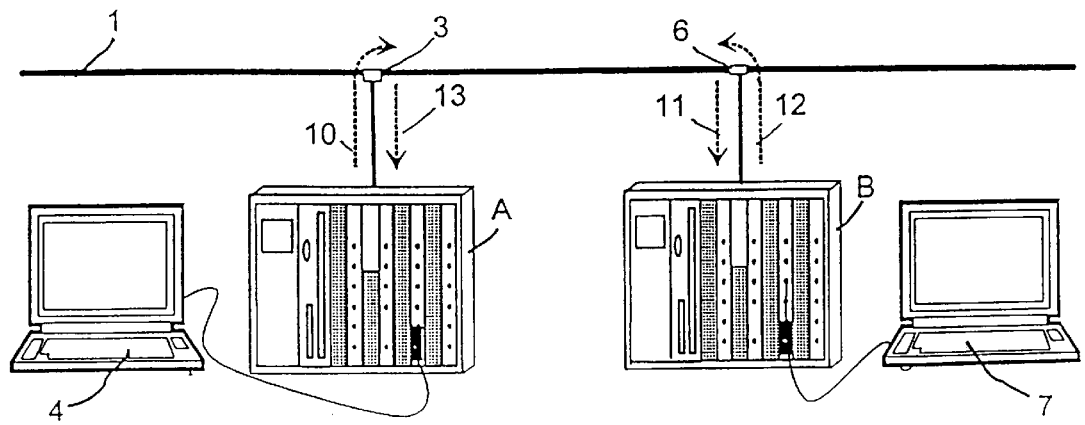
FIG. 2: shows two computers which interchange data by means of so-called broadcasts via a databus.

FIG. 2 shows a further example of a communications link between the two data processing systems A and B. No permanent communications link is set up between the two computers. Instead, communication is based on the so-called "broadcast principle". When required, the computer A feeds a message 10, a so-called broadcast, into the databus 1. All the other computers which are connected to the databus 1, in the example in FIG. 1 the computer B and possibly other computers that are not illustrated, are in an operating mode permitting data reception via the databus 1. All the other computers first of all receive the broadcast fed into the databus from computer A and then check whether the data in the broadcast are addressed to them or have contents that can be evaluated.

The synchronization method according to the invention can be used without any limitation at least for both types of connection illustrated in FIGS. 1 and 2. The method itself is explained in detail in the following text, by means of the example in FIG. 3.

Figure 3:
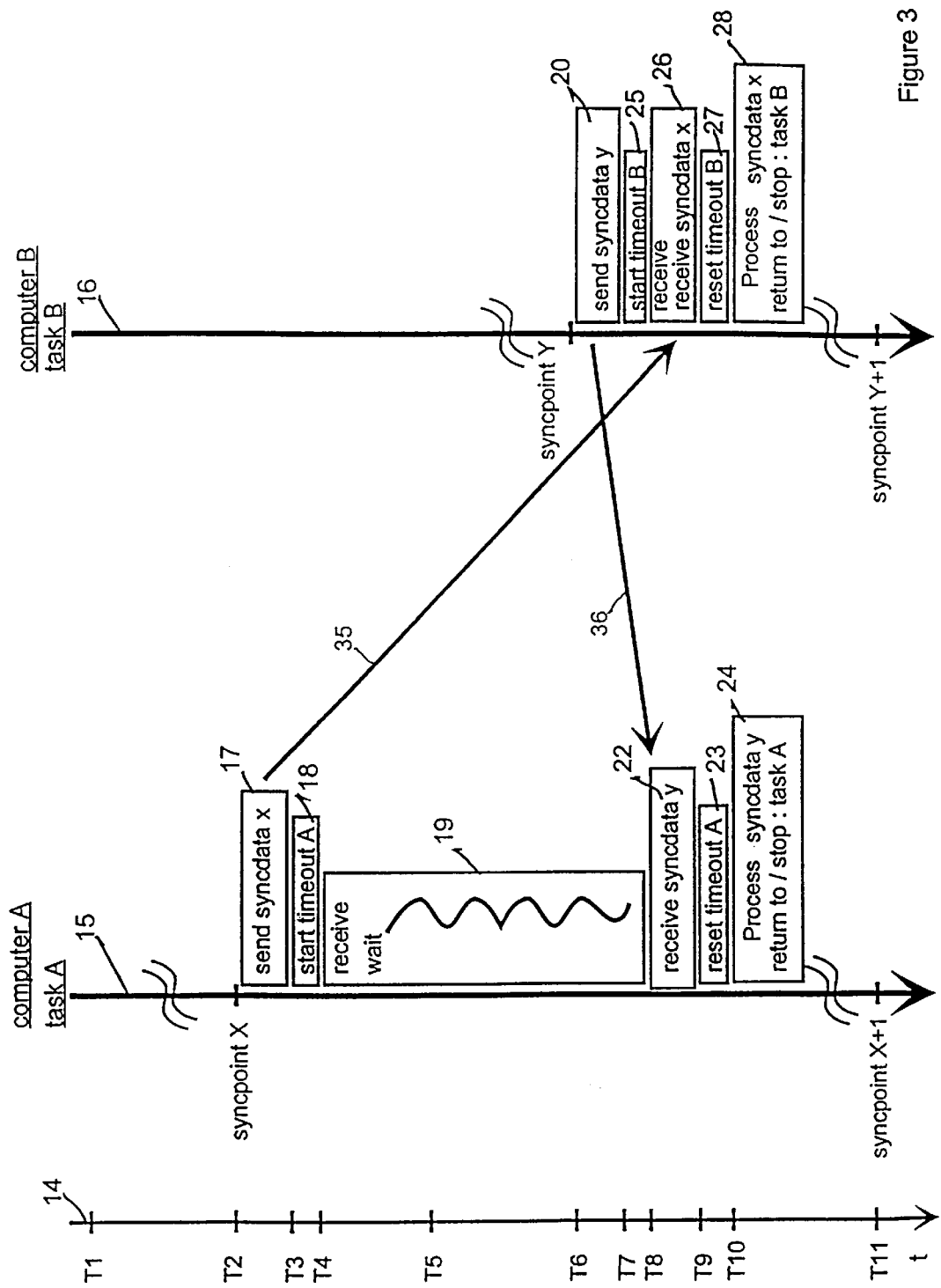
FIG. 3: shows a first timing diagram, on which the sequence of the synchronization method according to one embodiment of the invention is explained using the example of two computers in a network, which computers can form a so-called "one of two" or "two of two" computer system.

In the timing diagram in FIG. 3, a general time axis 14 with timing marks T1 ... T11 is shown on the left-hand side. These times represent the starting points of processing states of the two computers A and B, which occur during the sequence of the synchronization method. These processing states are represented in the form of function boxes on a time axis 15, located to the right of the general time axis 14, for the computer A and on a time axis 16, located on the extreme right of FIG. 3, for the computer B. The time axes 15, 16 for the computers A, B symbolize the sequence and the progress in the processing of instructions in programs which are running, in particular in user programs, which are called task A for the computer A, and task B for the computer B. The processing states required for the synchronization method are inserted into the natural sequence of processing the instructions for tasks A and B and thus result respectively in a temporary interruption in the processing sequence of the command instructions for tasks A, B. The method has the advantage that the additional processing states necessitated by the synchronization and inserted into the sequence of the individual tasks are as short as possible. The two tasks running on the computers A, B are thus interrupted only for as long as is absolutely necessary for the purpose of mutual synchronization.

In the case of the example illustrated in FIG. 3, it is assumed that processing states occur while a task is running in one computer. In other words, during the processing of the instructions in the user program which is running in the computer, an instruction occurs, e.g., which requests a synchronization process to run between the two computers. For example, on the time axis 15 for the computer A, these are the times T2=syncpoint X and T11=syncpoint X+1. In a corresponding manner, times T6=syncpoint Y and T11=syncpoint Y+1, which each initiate synchronization, are shown on the time axis 16 for computer B. To simplify matters, it is first assumed for sake of discussion that the tasks A and B running in the computers A and B, respectively, each comprise matching chains of command instructions. In other words, the same user programs are being processed by the computers A, B. As a result, the processing states associated with the synchronization times and T6=syncpoint Y therefore have identical contents in the respective tasks A, B. However, in the example in FIG. 3, the processing of these tasks on the computers A and B has taken place at different times, i.e., the processing is no longer being carried out approximately at the same time or synchronously. This can be seen in FIG. 3 from the fact that the syncpoint X in task A at the time T2 occurs earlier than the corresponding syncpoint Y in task B at the time T6.

The synchronization process initiated at time T2 is therefore necessary. This process is initiated when a given computer in the network, for example the computer A in FIG. 3, is the first to reach a synchronization point during the processing of the corresponding task, i.e., during instruction processing is the first to reach an instruction which requests synchronization with another computer or with the other computers in the network. Thus, at the time T2, further processing of the instructions in the user program which is running is interrupted by the computer A, and at least one set of synchronization data for at least one other computer in the network is fed into the data interface. In the example in FIG. 3, this is represented by the processing block 17, which is denoted by "send syncdata x", and has an arrow 35 originating from it.

Immediately after feeding in the synchronization data set, the computer which initiates the synchronization switches directly to a receive state, which is an operating mode allowing reception of corresponding data sets from programs on other computers in the network. Notably, in the course of feeding in the synchronization data set from the program of the transmitting computer, no reception of acknowledgment messages from the programs on receiving computers in the network is expected for completion of the feeding-in process. Instead, after feeding in the synchronization data set, a changeover is immediately made to a data receive state, and further processing of the current task is interrupted until the arrival of a corresponding synchronization data set from a program of another computer in the network. In FIG. 3, this is symbolized by the processing block 19 denoted by "receive wait" on the time axis 15 of computer A.

In order to reduce the amount of data to be interchanged and to be compared during synchronization, so-called signature formation can be used to considerably reduce the amount of data set is reduced by a type of compression to a uniquely identifying tag which may be of a very much smaller size than the data set.

During this processing block 19, which is denoted by "receive wait" and may also be regarded as a so-called "wait state with readiness to receive", the processing of the instructions in the user program "task B" continues on the computer B and, at the time T6, reaches a corresponding synchronization time, which is denoted by "syncpoint Y". The computer B now also interrupts the processing of the command instructions in the user program which is running, and feeds a synchronization data set into the databus. This is symbolized in FIG. 3 by the processing block 20, which is denoted by "send syncdata Y", on the time axis 16 of computer B and by an arrow 36 originating from it. As soon as the synchronization data set has been fed in, the computer B preferably switches to a state for receiving data. Since the computer A (which is the other computer in this example) in the network has already fed in its synchronization data set at the time T2, no "wait" phase occurs after computer B has switched over to the "receive" operating state. Rather, computer B can immediately receive the synchronization data set syncdata x which is already present. This is symbolized in FIG. 3, at the time T8, by the processing block 26, which is denoted by "receive/receive syncdata x", on the time axis 16 for computer B.

On the other hand, once the transmission time represented by the arrow 36 in FIG. 3 has passed, the synchronization data set which is sent by the computer B is immediately received by the computer A, which is locked in the "receive" operating mode, as represented by processing block 22. The reception is denoted by "receive syncdata y", on the time axis 15 of computer A. Its "wait" state ends as a result. Since the transmission duration of the synchronization data set "syncdata y", is relatively short as a rule, this reception likewise starts approximately at the time T8. Synchronism between the processing states of the two computers A and B has now been achieved approximately, and further instruction processing thus takes place virtually concurrently, so that the desired synchronization aim is achieved.

Both computers advantageously each carry out an analysis of the respectively received synchronization data set, at the time T10. For the computer A, this is represented on the time axis 15 by the processing block 24 "process sync data y", and for the computer B, this is represented on the time axis 16 by the processing block 28 "process sync data x". These two processing activities also take place virtually concurrently.

The contents of the respective synchronization data sets are irrelevant for the synchronization method according to the invention. In the simplest case, the synchronization data sets syncdata x and syncdata y transmitted backwards and forwards may each comprise a single bit whose function is to act as a time marker. Even this allows time synchronization of the processing states of computers to be achieved using the proposed method. Beyond this, the synchronization data sets may contain any desired additional information which can be used, for example, for matching the processing results from the two computers. In the example in FIG. 3, it is possible, depending on the result of comparing the synchronization data set syncdata x from computer A with the synchronization data set syncdata y from computer B in the processing block 24 ("process syndata y"), to initiate continuation of the processing of the command instructions in the interrupted task A ("return to / . . . : task A"), in particular if a match of the two synchronization data sets has been found. On the other hand, particularly if there is non-equivalence, further processing can be interrupted or not started again (". . . / stop: task A"). In the same way, by comparing the synchronization data set syncdata y from computer B with the synchronization data set syncdata x received from computer A in the processing block 28 ("processing syncdata x") of computer B, it is possible to initiate either a continuation of the processing of the command instructions in the interrupted task B ("return to /. . . task B"), or to finally terminate further processing (". . . / stop: task B").

The method has the particular advantage that the synchronization can be carried out particularly quickly, since the computers in the network which feed synchronization data into the data interface are not required to produce and wait for any acknowledgments, for example of correct reception of this data by another computer in the network. Instead, another computer in the network makes a virtual "response" by itself feeding synchronization data into the data interface. In this way, very effective synchronization can be achieved with minimal time losses and minimal additional load on the data transmission path between the computers in a network, on the basis of the additionally interchanged synchronization data sets. In the example in FIG. 3, this synchronization which has been achieved or reestablished is represented in each case by one further synchronization time "syncpoint x+1" or "syncpoint y+1" which occurs at the time t11, virtually concurrently, both in the processing of the command instructions for task A on the time axis 15 and in the processing of the command instructions for task B on the time axis 16.

According to a further embodiment, after one computer has received at least one set of synchronization data for at least one other computer in the network, a timeout is advantageously started by the one computer. Predetermined command instructions are executed by the one computer in the situation when it has not been possible for at least one other computer to receive any set of synchronization data by the end of the timeout. In particular, the one computer either generates a message or continues normal instruction processing. This measure is used to ensure that, if a fault occurs in another computer in the network, a computer requesting synchronization is not waiting indefinitely, and possibly in vain, for the arrival of a synchronization data set from this other computer. If a computer that has requested synchronization by feeding its synchronization data set into the data interface has not been able to receive a synchronization data set from another computer by the time it reaches the end of the predetermined timeout, then the requesting computer can initiate suitable measures. For example, it can terminate the synchronization attempt with other computers in the network, and continue the processing (which has been suspended for the duration of the synchronization attempt) of the instructions of the respective user program which is currently running.

This embodiment of the invention is illustrated in the example in FIG. 3. In this case, computer A starts such a timeout in the processing block 18 "start timeout A" at time T3 immediately after supplying the synchronization data set "send syncdata x" to the data interface. Since another synchronization data set, in the illustrated example syncdata y from computer B, is received after all in sufficient time at time T8 after a certain waiting time "wait" has elapsed, the timeout is reset again on reaching time T10 in the processing block 23 "reset timeout A". In the same way, such a timeout is started by computer B in the processing block 25 "start timeout B" at time T7 immediately after feeding the synchronization data set "send syncdata y" into the data interface.

Since computer B can immediately receive the synchronization data set syncdata x, which is already present, from computer A in the processing block 26, the timeout immediately following this in the processing block 27 "reset timeout B" can already be reset.

Figure 4:
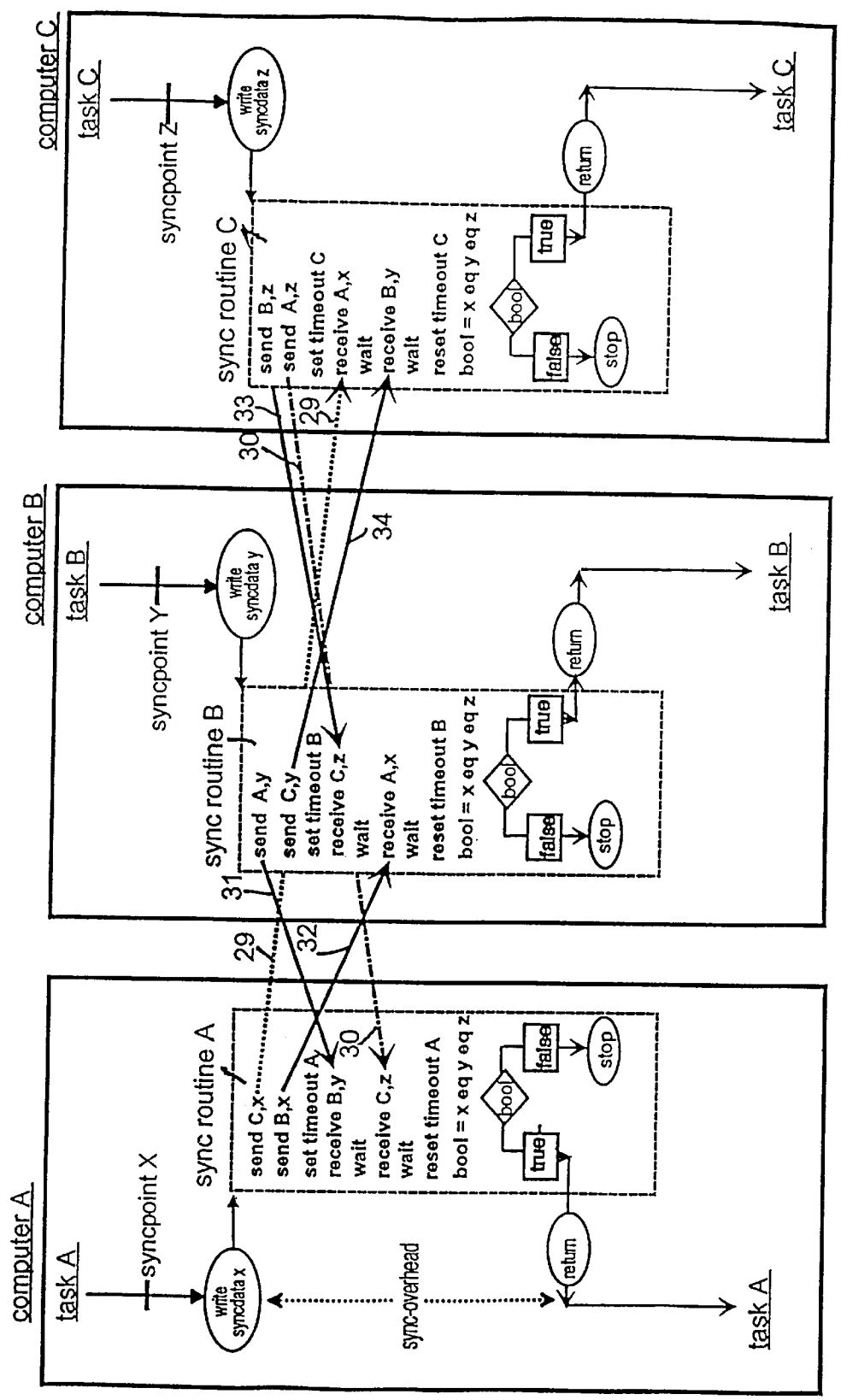
FIG. 4: shows a second timing diagram, in which the sequence of the synchronization method according to another embodiment of the invention is explained using the example of three computers in a network, which computers can form a so-called "two of three" computer system.

The sequence of a synchronization method according to the invention will be explained with reference to the example of a second timing diagram, illustrated in FIG. 4, for three computers in a network. The synchronization method according to the invention can also be applied, without any limitation, to a greater number of computers which are interconnected in a network. In the example of FIG. 4, the left hand region shows the sequence of a user program "task A" in a first processing block for computer A and, in particular, shows a synchronization routine "sync routine A" constructed in accordance with the invention. The central region in FIG. 4 shows the sequence of a user program "task B" in a second processing block for computer B, and, in particular, shows a synchronization routine "sync routine B" constructed in accordance with the invention. Finally, the right-hand region of FIG. 4 shows the sequence of a user program "task C" in a third processing block for computer C and, in particular, shows a synchronization routine "sync routine C" constructed in accordance with the invention. The computers are coupled to one another in a network via a data network. In one application, the user programs task A, task B and task C may comprise identical command instructions, so that the network illustrated in FIG. 4 then represents a computer network system as explained above, a so-called "two out of three" system.

During normal instruction processing, computers A, B and C each reach a program item in which synchronization with the other computers in the network is requested and initiated. In the processing blocks in FIG. 4, these are the program item "syncpoint X" in the sequence of "task A", the program item "syncpoint Y" in the sequence of "task B", and the program item "syncpoint Z" in the sequence of "task C". Each of these program items is respectively followed by an instruction routine entitled "write syncdata x", "write syncdata y" or "write syncdata z", respectively. This results in the processing of the respective task A, task B or task C being interrupted. If required, temporary data are buffer-stored for subsequent continuation of program processing, and a synchronization data set "syncdata x", "syncdata y" or "syncdata z", respectively, is generated by the corresponding computer A, B or C for the respective synchronization routine and for feeding into the data interface.

The synchronization routine "sync routine A" from computer A comprises the following command instructions in the example in FIG. 4:
1. send C,x
2. send B,x
3. set timeout A
4. receive B,y
5. wait
6. receive C,z
7. wait
8. reset timeout A
9. bool=x eq y eq z The synchronization routine "sync routine B" from computer B comprises the following command instructions in the example in FIG. 4:
10. send A,y
11. send C,y
12. set timeout B
13. receive C,z
14. wait
15. receive A,x
16. wait
17. reset timeout B
18. bool=x eq y eq z The synchronization routine "sync routine C" from computer C comprises the following command instructions in the example in FIG. 4:
19. send B,z
20. send A,z
21. set timeout C
22. receive A,x
23. wait
24. receive B,y
25. wait
26. reset timeout C
27. bool=x eq y eq z The meanings of the individual command instructions 1 to 27 in the synchronization routines are as follows:

1. Computer A feeds a synchronization data set x, which is addressed to the computer C in the network, into the data interface (see the dashed arrow with the reference symbol 29).

2. Computer A feeds a synchronization data set x, which is addressed to the computer B in the network, into the data interface (see the solid arrow with the reference symbol 32).

3. Computer A starts a timeout A, within which it waits to receive the synchronization messages y, z from the other computers B, C in the network. Computer A switches to a receive state and interrupts further instruction processing.

4. Computer A receives a synchronization data set y which is addressed to it and has been fed in by computer B (see the solid arrow with the reference symbol 31).

5. Computer A remains in the receive state and continues to interrupt instruction processing.

6. Computer A receives a synchronization data set z which is addressed to it and has been fed in by the computer C (see the dash-dotted arrow with the reference symbol 30).

7.–8. Computer A resets the timeout A before reaching the predetermined timeout point since, in the meantime, it has successfully received the expected synchronization data sets from computers B and C in good time.

9. Computer A carries out processing operations on its own synchronization data set x and on the received synchronization data sets y, z. The contents of the synchronization data sets x, y, z are checked to see if they are identical. If the desired result is obtained from the processing operations, then the further processing of task A is continued. Otherwise, the instruction processing of task A on computer A remains interrupted, and an application-dependent fault procedure is initiated.

10. Computer B feeds a synchronization data set y, which is addressed to the computer A in the network, into the data interface (see the solid arrow with the reference symbol 31).

11. Computer B feeds a synchronization data set y, which is addressed to the computer C in the network, into the data interface (see the solid arrow with the reference symbol 34).

12. Computer B starts a timeout B, within which it waits to receive the synchronization messages x, z from the other computers A, C in the network. Computer B switches to a receive state and interrupts further instruction processing.

13. Computer B receives a synchronization data set z which is addressed to it and has been fed in by the computer C (see the solid arrow with the reference symbol 33).

14. Computer B remains in the receive state and continues to interrupt instruction processing.

15. Computer B receives a synchronization data set x which is addressed to it and has been fed in by the computer A (see the solid arrow with the reference symbol 32).

16.–17. Computer B resets the timeout B before reaching the predetermined timeout point since, in the meantime, it has successfully received the expected synchronization data sets from computers A and C in good time.

18. Computer B carries out processing operations on its own synchronization data set y and on the received synchronization data sets x, z. The contents of the synchronization data sets x, y, z are checked to see if they are identical. If the desired result is obtained from the processing operations, then the further processing of task B is continued. Otherwise, the instruction processing of task B on computer B remains interrupted, and an application-dependent fault procedure is initiated.

19. Computer C feeds a synchronization data set z, which is addressed to the computer B in the network, into the data interface (see the solid arrow with the reference symbol 33).

20. Computer C feeds a synchronization data set z, which is addressed to the computer A in the network, into the data interface (see the dash-dotted arrow with the reference symbol 30).

21. Computer C starts a timeout C, within which it waits to receive the synchronization messages x, y from the other computers A, B in the network. Computer C switches to a receive state and interrupts further instruction processing.

22. Computer C receives a synchronization data set x which is addressed to it and has been fed in by the computer A (see the dashed arrow with the reference symbol 29).

23. Computer C remains in the receive state and continues to interrupt instruction processing.

24. Computer C receives a synchronization data set y which is addressed to it and has been fed in by computer B (see the dashed arrow with the reference symbol 29).

25.–26. Computer C resets the timeout C before reaching the predetermined timeout point since, in the meantime, it has successfully received the expected synchronization data sets from computers A and B in good time.

27. Computer C carries out processing operations on its own synchronization data set z and on the received synchronization data sets x, y. The contents of the synchronization data sets x, y, z are checked to see if they are identical. If the desired result is obtained from the processing operations, then the further processing of task C is continued. Otherwise, the instruction processing of task C on computer C remains interrupted, and an application-dependent fault procedure is initiated.

The exemplary embodiment illustrated in FIG. 4 already takes account, according to a further embodiment, of the fact that, in the situation where more than two computers are connected or can be connected via the data interface, each computer A, B or C respectively feeds in one set of synchronization data addressed to the other computers in the network. This computer waits, in the opposite sequence to that previously used for feeding in, to receive a corresponding set of synchronization data from the other computers in the network. Thus, e.g., the computer A in FIG. 4 feeds in respective synchronization data sets x (send C,x and send B,x) addressed to the computer C and to the computer B, respectively, in the network. In the opposite sequence to this transmission sequence, computer A then waits to receive the synchronization data sets y and z from the computers B and C (receive B,y and receive C,z).

The synchronization method according to the invention can also be used without any change if the tasks of the connected computers do not comprise identical sequences of command instructions, but rather are set up merely to interchange data in specific program items, or even if only one computer is set up to receive data from the other computer.

The above description of the preferred embodiments has been given by way of example. From the disclosure given, those skilled in the art will not only understand the present invention and its attendant advantages, but will also find apparent various changes and modifications to the structure and method disclosed. It is sought, therefore, to cover all such changes and modifications as fall within the spirit and scope of the invention, as defined by the appended claims, and equivalents thereof.

What is claimed is:

1. A method for synchronizing programs on at least two computers in a network, which are connected to one another via a data interface, said method comprising:
   a) interrupting processing of instructions in a program that is running on one of the computers when, during the processing, an instruction occurs which requests synchronization of the program in the one computer with at least one other program on at least one other of the computers in the network,
   b) feeding at least one set of synchronization data from the one computer into the data interface for the at least one other computer in the network,
   c) after feeding in the at least one set of synchronization data, switching the one computer to a receive state, and
   d) further interrupting the process of the instructions in the program that is running on the one computer in anticipation of the one computer receiving, via the data interface, at least one set of synchronization data from the at least one other program running on the at least one other computer in the network,
   wherein the at least one set of synchronization data from the at least one other computer is provided into the data interface as a result of a process that is independent from the at least one other computer having received the at least one set of synchronization data from the one computer.

2. The method as claimed in claim 1, further comprising:
   a) after feeding in the at least one set of synchronization data for the at least one other computer in the network, starting an internal timeout in the one computer, and
   b) when no set of synchronization data is received from the at least one other computer during the internal timeout, executing predetermined command instructions in the one computer.

3. The method as claimed in claim 2, wherein the predetermined command instructions comprise generating a message in the one computer.

4. The method as claimed in claim 2, wherein the predetermined command instructions comprise terminating the processing of the instructions in the program that is running on the one computer.

5. The method as claimed in claim 1, further comprising:
   a) after feeding in the at least one set of synchronization data for the at least one other computer in the network, starting an internal timeout in the one computer, and
   b) when a set of synchronization data is received from the at least one other computer during the internal timeout, resetting the internal timeout in the one computer and continuing the processing of the instructions in the program that is running on the one computer.

6. The method as claimed in claim 1, wherein:
   more than two computers are connected to one another via the data interface,
   said feeding step comprises feeding a plurality of sets of synchronization data in a given sequence from the one computer into the data interface, each of the other computers in the network being a destination for at least one of the sets of synchronization data, and
   said further interrupting step comprises awaiting reception, in a sequence opposite the given sequence, by the one computer, of a corresponding plurality of sets of synchronization data from the other computers in the network.

7. A method for synchronizing programs running on at least two independent computers in a network, the computers being connected to one another via a data interface, said method comprising:
   a) interrupting processing of instructions in a first program running on one of the computers when, during processing of the first program, a first synchronization request instruction initiated with the one computer occurs, wherein the first synchronization request requests synchronization of the first program with at least a second program on at least one other of the computers in the network;
   b) feeding first synchronization data from the one computer into the data interface for the at least one other computer in the network;
   c) placing the first program in a wait state;
   d) interrupting processing of instructions in the second program when, during processing of the second program, a second synchronization request instruction initiated within the at least one other computer occurs, wherein the second synchronization request requests synchronization of the second program with at least the first program; and
   e) feeding second synchronization data from the at least one other computer into the data interface for the one computer.

8. The method as claimed in claim 7, further comprising:
   f) receiving, in the at least one other computer, said first synchronization data after said second synchronization data is fed from the at least one other computer to the one computer.

9. The method as claimed in claim 8, further comprising:
   g) receiving, in the one computer, said second synchronization data at substantially the same time that said first synchronization data is received by the at least one other computer.

10. A computer network system comprising:
    first and second computers respectively running first and second programs, said first and second computers being operatively connected to a data interface;
    a first synchronization requestor operable to interrupt said first program by requesting said first computer send first synchronization data to said second computer;
    a second synchronization requester operable to independently interrupt said second program by requesting said second computer to send second synchronization data to said first computer;
    wherein said second computer receives said first synchronization data from said first computer after said second computer is interrupted and said second synchronization data is sent from said second computer to said first computer.

11. A computer network system according to claim 10, wherein said first synchronization data is received by said second computer at substantially the same time that said second synchronization data is received by said first computer.

* * * * *